United States Patent
Hooli et al.

(10) Patent No.: US 9,414,249 B2
(45) Date of Patent: Aug. 9, 2016

(54) PROVIDING ENHANCED CSI COVERAGE BY REPORTING THE SAME MEASURE IN MULTIPLE SUB-FRAMES

(71) Applicant: Nokia Solutions and Networks oy, Espoo (FI)

(72) Inventors: Kari Juhani Hooli, Oulu (FI); Timo Erkki Lunttila, Espoo (FI); Kari Pekka Pajukoski, Oulu (FI); Esa Tapani Tiirola, Kempele (FI)

(73) Assignee: Nokia Solutions and Networks Oy, Espoo (FI)

( * ) Notice: Subject to any disclaimer, the term of this patent is extended or adjusted under 35 U.S.C. 154(b) by 118 days.

(21) Appl. No.: 14/352,833

(22) PCT Filed: Oct. 25, 2012

(86) PCT No.: PCT/EP2012/071124
§ 371 (c)(1),
(2) Date: Apr. 18, 2014

(87) PCT Pub. No.: WO2013/060763
PCT Pub. Date: May 2, 2013

(65) Prior Publication Data
US 2014/0301231 A1    Oct. 9, 2014

Related U.S. Application Data

(60) Provisional application No. 61/552,043, filed on Oct. 27, 2011.

(51) Int. Cl.
*H04W 24/08* (2009.01)
*H04W 24/10* (2009.01)
(Continued)

(52) U.S. Cl.
CPC ............. *H04W 24/08* (2013.01); *H04L 1/0026* (2013.01); *H04L 1/0027* (2013.01);
(Continued)

(58) Field of Classification Search
CPC ..... H04W 24/08; H04W 24/10; H04L 43/067
See application file for complete search history.

(56) References Cited

U.S. PATENT DOCUMENTS

2009/0316626 A1*  12/2009  Lee ................. H04L 1/1607
                                                            370/328
2010/0202311 A1    8/2010  Lunttila et al. ........... 370/252
(Continued)

FOREIGN PATENT DOCUMENTS

EP          2139150 A2    12/2009

OTHER PUBLICATIONS

3rd Generation Partnership Project, Technical Specification, Group Radio Access Network; Evolved Universal Terrestrial Radio Access (E-UTRA); Physical layer procedures(Release 10), Sep. 2011, 3GPP TS 36.213 V10.3.0 (Sep. 2011).*

(Continued)

*Primary Examiner* — Chi H Pham
*Assistant Examiner* — Shailendra Kumar
(74) *Attorney, Agent, or Firm* — Harrington & Smith

(57) ABSTRACT

The application relates to channel state feedback reporting in wireless communication networks and in particular to modifications of the procedure for reporting CSI as specified by section 7.2 of 3GPP TS 36.213 V10.3.0. and the corresponding RRC protocol as specified by 3GPP TS 36.331 V10.2.0. The current cycle for CSI measurement and reporting is such that the UE performs separate CSI measurements for each report. However, the coverage area of CSI measurement reporting is lower than other uplink reporting such as e.g. ACK/NACK on PUCCH which supports subframe repetition, leading to an imbalance. Therefore, it is rather clear that it is highly beneficial to support coverage extension for CSI reports. The issue then arises as to how to realize the CSI coverage enhancement on top of existing/evolving CSI reporting framework. The application proposes to realize said CSI coverage enhancement by reporting (450) the same CSI report multiple times from the UE (110) to an eNB (220).

37 Claims, 4 Drawing Sheets

(51) Int. Cl.
| | |
|---|---|
| *H04L 1/00* | (2006.01) |
| *H04L 1/08* | (2006.01) |
| H04L 12/26 | (2006.01) |
| H04W 28/08 | (2009.01) |

(52) U.S. Cl.
CPC ............ *H04L 1/0028* (2013.01); *H04L 1/0064* (2013.01); *H04L 1/0072* (2013.01); *H04L 1/08* (2013.01); *H04W 24/10* (2013.01); *H04L 43/067* (2013.01); *H04W 28/08* (2013.01)

(56) References Cited

U.S. PATENT DOCUMENTS

| | | | | |
|---|---|---|---|---|
| 2013/0083748 A1* | 4/2013 | Li | ............................ | H04L 5/14 370/329 |
| 2013/0114554 A1* | 5/2013 | Yang | ..................... | H04W 24/10 370/329 |

OTHER PUBLICATIONS

Ericsson, NTT DoCoMo, E-UTRA Uplink Control Signaling—Overhead Assessment, TSG RAN WG1 #44, Denver, CO, USA, Feb. 13-17, 2006, R1-060583.*

NTT DoCoMo, Investigation on Performance of CQI Report in Coverage-limited Conditions, 3GPP TSG RAN WG1 Meeting #50, Athens, Greece, Aug. 20-24, 2007, R1-073703.*

China Telecom , LTE Coverage Enhancements ,3GPP TSG RAN #53 Fukuoka, Japan, Sep. 13-16, 2011, RP-111359.*

Costello, Jr, D J and Forney, Jr, G D, Channel coding: The road to channel capacity, Jun. 2007, Proceedings of the IEEE, vol. 95: pp. 1150-1177.*

3GPP TS 36.213 V10.3.0 (Sep. 2011); "3rd Generation Partnership Project; Technical Specification Group Radio Access Network; Evolved Universal Terrestrial Radio Access (E-UTRA); Physical layer procedures (Release 10)"; 122 pgs.

3GPP TS 36.300 V8.12.0 (Mar. 2010); "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; 149 pgs.

3GPP TS 36.300 V9.7.0 (Mar. 2011); "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)"; 174 pgs.

3GPP TS 36.300 V10.4.0 (Jun. 2011); "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)"; 194 pgs.

3GPP TS 36.331 V10.2.0 (Jun. 2011); "3rd Generation Partnership Project; Technical Specification Group Radio Access Network; Evolved Universal Terrestrial Radio Access (E-UTRA); Radio Resource Control (RRC); Protocol specification (Release 10)"; 294 pgs.

3GPP TR 36.814 V9.0.0 (Mar. 2010); "3rd Generation Partnership Project; Technical Specification Group Radio Access Network; Evolved Universal Terrestrial Radio Access (E-UTRA); Further advancements for E-UTRA physical layer aspects (Release 9)"; 104 pgs.

TSG-RAN WGI #44; "E-UTRA Uplink Control Signaling—Overhead Assessment"; Denver, CO, USA, Feb. 13-17, 2006; R1-060583; 3 pgs.

3GPP TSG RAN WGi Meeting #50; "Investigation on Performance of CQI Report in Coverage-limited Conditions"; Athens, Greece, Aug. 20-24, 2007; R1-073703; 4 pgs.

3GPP TSG RAN WG1 Meeting #52bis; "Coverage Comparison between PUSCH, PUCCH, and RACH"; Shenzhen, China, Mar. 31-Apr. 4, 2008; R1-081461; 2 pgs.

3GPP TSG RAN #53; "LTE Coverage Enhancements"; Fukuoka, Japan, Sep. 13-16, 2011; RP-111359; 5 pgs.

* cited by examiner

| Service /Payload | | PUSCH: VoIP 12.2 kbit/s | | | | RACH Mess.3 80 bits | RACH Preamble | | PUCCH 1 A/N Bit | PUCCH CQI 5 Bit | PUSCH 1 A/N Bit |
|---|---|---|---|---|---|---|---|---|---|---|---|
| Criterion | | VoIP Packet Residual BLER 2% | | | | Residual BLER 1% | P(FA)=0.1% P(MS)=1% | P(FA)=1% P(MS)=1% | P(FA)=1% P(MS)=1% | 5% BLER | P(FA)=1% P(MS)=1% |
| Number of TTI bundled | | 1 | 1 | 4 | 8 | 1 | 1 | 1 | 1 | 1 | 1 |
| Number of Segment | | 1 | 2 | 1 | 1 | 1 | 1 | 2 | 1 | 1 | 1 |
| Number of Re-Trans/Segment | | 6 | 6 | 3 | 3 | 3 | 1 | 1 | 1 | 1 | 1 |
| EIRP | [dBm] | 24 | 24 | 24 | 24 | 24 | 24 | 24 | 24 | 24 | 24 |
| Tx BW | [kHz] | 360 | 360 | 360 | 180 | 180 | 1080 | 1080 | 180 | 180 | 360 |
| Receiver Noise Figure | [dB] | 2 | 2 | 2 | 2 | 2 | 2 | 2 | 2 | 2 | 2 |
| Receiver Noise Power | [dBm] | -116.4 | -116.4 | -116.4 | -119.4 | -119.4 | -111.7 | -111.7 | -119.4 | -119.4 | -116.4 |
| Interference Margin | [dB] | 3 | 3 | 3 | 3 | 3 | 3 | 3 | 3 | 3 | 3 |
| Required SNR | [dB] | -4.2 | -6.0 | -8.0 | -8.1 | -2.9 | -11.3 | -13.5 | -7.5 | -8.4 | -6.9 |
| Receiver Sensitivity | [dBm] | -117.6 | -119.4 | -121.4 | -124.5 | -119.3 | -120.0 | -122.2 | -123.9 | -124.8 | -120.3 |
| Coverage Area in CASE 3 | [%] | 84 | 88 | 93 | 97 | 89 | 90 | 94 | 96 | 96 | 91 |

FIG. 1

PROVIDING ENHANCED CSI COVERAGE BY REPORTING THE SAME MEASURE IN MULTIPLE SUB-FRAMES

TECHNICAL FIELD

This invention relates generally to wireless communication and, more specifically, relates to reporting of channel state information (CSI) networks.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

The following abbreviations that may be found in the specification and/or the drawing figures are defined as follows:

3GPP third generation partnership project
A/N, ACK/NACK acknowledgement/negative acknowledgement
CA carrier aggregation
CoMP coordinated multi-point
CQI channel quality indicator
CSI channel state information
dB decibels
DL downlink
eICIC enhanced interference control interference coordination
EIRP effective isotropic radiated power
eNB or eNodeB base station, evolved Node B
LTE long term evolution
FDD frequency division duplexing
HARQ hybrid automatic repeat request
LTE long term evolution
LTE-A long term evolution—advanced
NDI new data indicator
MAC medium access control
MCS modulation and coding scheme
MME mobility management entity
PDCCH physical downlink control
PMI precoding matrix indicator
PRB physical resource block
PTI precoding type indicator
PUCCH physical uplink control channel
PUSCH physical uplink shared channel
RAN radio access network
Rel release
RI Rank Indicator
RRC radio resource control
SGW serving gateway
SI study item
TS technical specification
Tx transmission
TTI transmission time interval
UE user equipment
UL uplink
UL-SCH uplink shared channel Releases of certain communication systems are referenced below. A short description of these releases is now presented. The specification of a communication system known as evolved UTRAN (E-UTRAN, also referred to as UTRAN-LTE, universal terrestrial radio access network-long term evolution, or as E-UTRA) is currently nearing completion within the 3GPP (third generation partnership project). One specification of interest is 3GPP TS (technical standard) 36.300, V8.12.0 (April 2010), "3rd Generation Partnership Project; Technical Specification Group Radio Access Network; Evolved Universal Terrestrial Radio Access (E UTRA) and Evolved Universal Terrestrial Access Network (E-UTRAN); Overall description; Stage 2 (Release 8)". This system may be referred to, for convenience, as LTE Rel-8 (which also contains 3G HSPA, third generation high speed packet access, and its improvements). In general, the set of specifications given generally as 3GPP TS 36.xyz (e.g., 36.211, 36.311, 36.312, etc.) may be seen as describing the Release 8 LTE system. Release 9 (Rel-9) versions of these specifications have also been published, including 3GPP TS 36.300, V9.7.0 (March 2011). Release 10 (Rel-10) versions of these specifications have additionally been published, including 3GPP TS 36.300, V10.4.0 (June 2011).

There is a new study item (SI) proposal in RP-111359, "LTE Coverage Enhancements", 3GPP TSG RAN #53 (13-16 Sep. 2011) (a copy of which is attached hereto as Exhibit A, which forms part of this disclosure), which concerns LTE coverage enhancements. The SI was approved in RAN#53. The goal of the SI is for example "to identify any potential issues due to coverage bottlenecks by taking coverage imbalances into account, for example between control and data channels, uplink and downlink, or initial access and data transmission".

There are coverage bottlenecks that are identified and can be improved.

SUMMARY

This section contains examples of possible implementations and is not meant to be limiting.

In an exemplary embodiment, a method is disclosed that includes performing, at a user equipment, one or more channel state information measurements on selected ones of a plurality of downlink subframes, and reporting from the user equipment to a base station a single channel state information report in multiple uplink subframes. The single channel state information report corresponds to the one or more channel state information measurements of the selected ones of plurality of downlink subframes.

A further exemplary embodiment is a computer program comprising program code for executing the method of the previous paragraph. Another exemplary embodiment is the computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: performing, at a user equipment, one or more channel state information measurements on selected ones of a plurality of downlink subframes; and reporting from the user equipment to a base station a single channel state information report in multiple uplink subframes, the single channel state information report corresponding to the one or more channel state information measurements of the selected ones of plurality of downlink subframes.

Another exemplary embodiment apparatus comprises means for performing, at a user equipment, one or more channel state information measurements on selected ones of a plurality of downlink subframes; and means for reporting from the user equipment to a base station a single channel state information report in multiple uplink subframes, the single channel state information report corresponding to the one or more channel state information measurements of the selected ones of plurality of downlink subframes.

An exemplary computer program product includes a computer-readable medium bearing computer program code embodied therein for use with a computer, the computer program code including: code for performing, at a user equipment, one or more channel state information measurements on selected ones of a plurality of downlink subframes; and code for reporting from the user equipment to a base station a single channel state information report in multiple uplink subframes, the single channel state information report corresponding to the one or more channel state information measurements of the selected ones of plurality of downlink subframes.

Yet another exemplary embodiment is a method that includes signaling from a base station to a user equipment information the user equipment uses to perform one or more channel state information measurements on selected ones of a plurality of downlink subframes, and receiving at the base station from the user equipment a single channel state information report in multiple uplink subframes. The single channel state information report corresponds to the one or more channel state information measurements on the selected ones of plurality of downlink subframes.

A further exemplary embodiment is a computer program comprising program code for executing the method of the previous paragraph. Another exemplary embodiment is the computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: signaling from a base station to a user equipment information the user equipment uses to perform one or more channel state information measurements on selected ones of a plurality of downlink subframes; and receiving at the base station from the user equipment a single channel state information report in multiple uplink subframes, the single channel state information report corresponding to the one or more channel state information measurements on the selected ones of plurality of downlink subframes.

An exemplary computer program product includes a computer-readable medium bearing computer program code embodied therein for use with a computer, the computer program code including: code for signaling from a base station to a user equipment information the user equipment uses to perform one or more channel state information measurements on selected ones of a plurality of downlink subframes; and code for receiving at the base station from the user equipment a single channel state information report in multiple uplink subframes, the single channel state information report corresponding to the one or more channel state information measurements on the selected ones of plurality of downlink subframes.

BRIEF DESCRIPTION OF THE DRAWINGS

In the attached Drawing Figures:

FIG. 1 is a table used to describe coverage areas under certain assumptions for various channels in an LTE system.

DETAILED DESCRIPTION OF THE DRAWINGS

Figure 2:
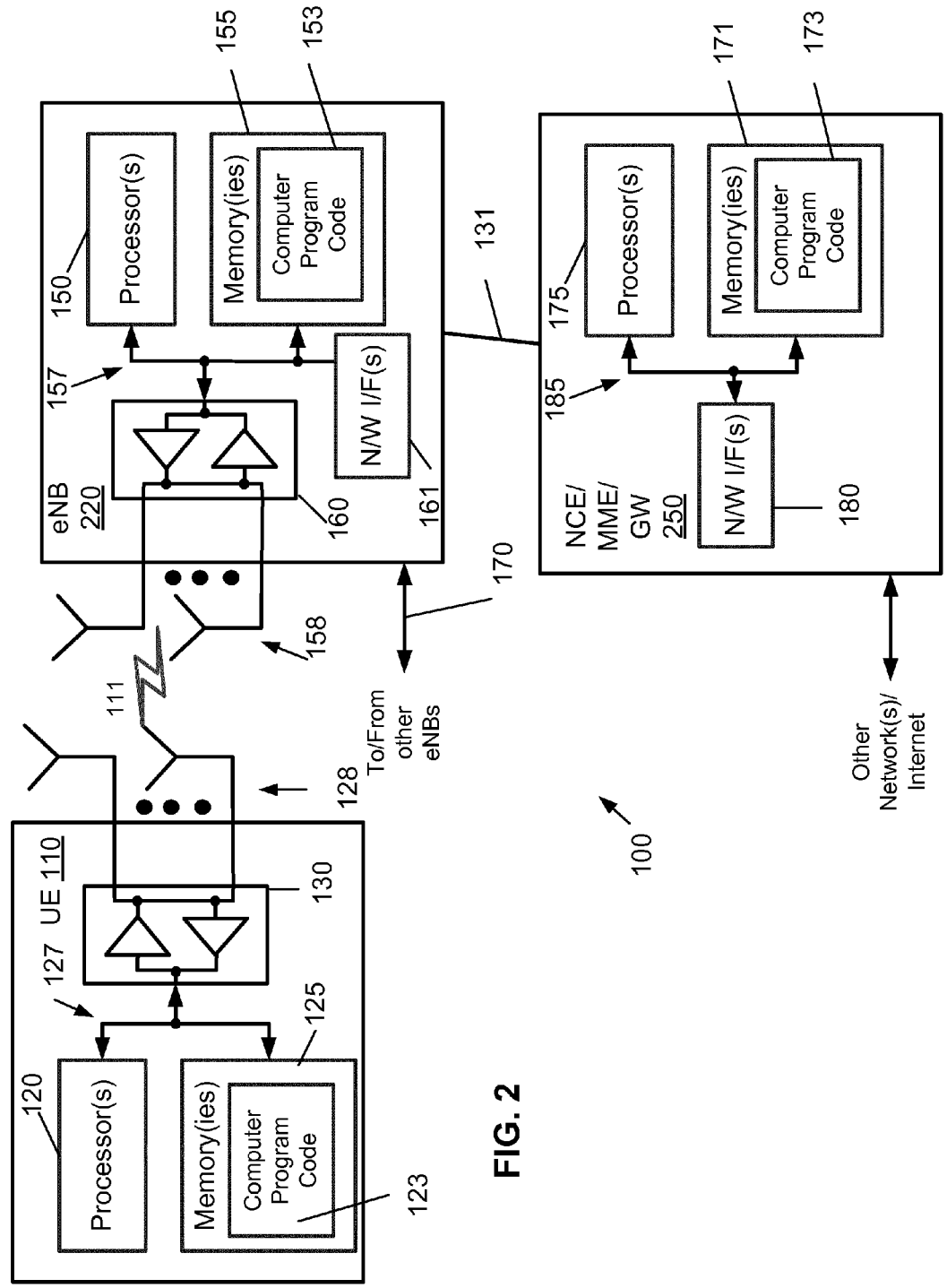
FIG. 2 is a block diagram of an exemplary system in which the exemplary embodiments may be practiced.

This disclosure relates to the evolution of LTE-Advanced, which will most likely be part of LTE Rel-11. For reasons described in more detail below, the inventors have identified CSI coverage as a potential coverage bottleneck. More specifically, CSI signaling in the uplink coverage limited situation is examined and improved. The exemplary embodiments increase coverage area of CSI transmitted on PUCCH/PUSCH.

Neither subframe bundling nor HARQ is supported for CSI reporting in LTE Rel-8/9/10. This means that the coverage is already compromised in Rel-10. Thus, CSI will be one of the bottlenecks in UL coverage. The problem is demonstrated in the table in FIG. 1, which shows the link budget comparison between different UL channels. The table in FIG. 1 is from R1-081461, "Coverage Comparison between PUSCH, PUCCH and RACH", 3GPP TSG RAN WG1 Meeting #52bis (Mar. 31-Apr. 4, 2008) (a copy of which is attached hereto as Exhibit B, which forms part of this disclosure). This table shows the link budget calculation for different UL channels and transmission schemes. In the table, P(FA)=probability of false alarm, P(MS)=probability of missed detection. The table assumes a deployment scenario referred to as Case 3, which represents a coverage limited scenario (see more details in 3GPP TR 36.814 V9.0.0 (March 2010)). In the bottom line of the table, there is shown the coverage area that can be reached based on the assumptions in Case 3. The ideal scenario is each coverage area should be 100 percent.

It is noted that 5-bit periodic CQI transmitted on PUCCH has the same coverage area as 1-bit A/N without subframe repetition. The link budget difference between 5-bit CQI and the most commonly used 4-bit CQI is about 0.8 dB. However, 1-bit A/N (PUCCH) supports subframe repetition over four subframes already in Rel-8 (not shown in the table), leading to clear coverage imbalance between different UL channels, as 1-bit A/N (PUCCH) with subframe repetition would have a higher coverage area than shown in the table (shown as 96) and this coverage area is higher than the coverage area for 5-bit periodic CQI transmitted on PUCCH. This means there is an imbalance between coverage area between CQI and A/N on PUCCH, and therefore there is motivation to improve CQI coverage. The exemplary embodiments herein improve the coverage area for CQI transmitted on PUCCH.

Furthermore, considering the aperiodic CSI transmitted on PUSCH, the need for enhanced CSI feedback (related to enhanced carrier aggregation, CoMP, eICI, and the like) will aggravate the coverage problem, as there is a need to support CSI payloads in the order of 100 bits or even more, again without the benefit of HARQ or subframe bundling. On the other hand, it is known that cell edge UEs will receive the biggest benefit from the accurate CSI, as their coverage relies often on the correct choice of PRBs/MCS/PMI. Hence, it is rather clear that it is highly beneficial to support coverage extension for CSI reports. The issue then arises as to how to realize the CSI coverage enhancement on top of existing/evolving CSI reporting framework.

Subframe bundling, which is the coverage extension scheme applied for the UL-SCH, already exists. This is illustrated by 3GPP TS 36.213 V10.3.0 (September 2011). Exhibit C includes sections 7.2 through and including section 8 of 36.213, and this Exhibit forms part of the present disclosure. In particular, see section 8 of 36.213:

"For FDD and transmission mode 1, there shall be 8 uplink HARQ processes per serving cell for non-subframe bundling operation, i.e. normal HARQ operation, and 4 uplink HARQ processes for subframe bundling operation. For FDD and transmission mode 2, there shall be 16 uplink HARQ processes per serving cell for non-subframe bundling operation and there are two HARQ processes associated with a given subframe as described in [8]. The subframe bundling operation is configured by the parameter ttiBundling provided by higher layers.

"In case higher layers configure the use of subframe bundling for FDD and TDD, the subframe bundling operation is only applied to UL-SCH, such that four consecutive uplink subframes are used."

See also section 7.2.2 of 36.213 (at page 61):

"If parameter ttiBundling provided by higher layers is set to TRUE and if an UL-SCH in subframe bundling operation collides with a periodic CSI reporting instance, then the UE shall drop the periodic CSI report of a given PUCCH reporting type in that subframe and shall not multiplex the periodic CSI report payload in the PUSCH transmission in that subframe. A UE is not expected to be configured with simultaneous PUCCH and PUSCH transmission when UL-SCH subframe bundling is configured."

However, the current subframe bundling does not apply to periodic or aperiodic CSI.

In order to improve CSI coverage, the eNodeB may also request the UE to transmit the aperiodic CSI repeatedly by sending multiple triggers to the UE. However, this will waste PDCCH resources, as a separate UL grant is required for each case. Furthermore, coherent combining of the reports at the eNodeB is not possible since the contents of the CSI reports are not restricted from changing and likely will change from one subframe to another. The same issue will prevent efficient implementation-driven solution for the periodic CSI bundling on PUCCH as well.

The exemplary embodiments herein describe techniques for providing enhanced CSI coverage in the uplink direction. Additional description of these techniques is presented after a system into which the exemplary embodiments may be used is described.

Turning to FIG. 2, this figure shows a block diagram of an exemplary system in which the exemplary embodiments may be practiced. In FIG. 2, a UE 110 is in wireless communication with a network 100. The user equipment 110 includes one or more processors 120, one or more memories 125, and one or more transceivers 130 interconnected through one or more buses 127. The one or more transceivers 130 are connected to one or more antennas 128. The one or more memories 125 include computer program code 123. The one or more memories 125 and the computer program code 123 are configured to, with the one or more processors 120, cause the user equipment 110 to perform one or more of the operations as described herein. The UE 110 communicates with eNB 220 via link 111.

The eNB 220 includes one or more processors 150, one or more memories 155, one or more network interfaces (N/W I/F(s)) 161, and one or more transceivers 160 interconnected through one or more buses 157. The one or more transceivers 160 are connected to one or more antennas 158. The one or more memories 155 include computer program code 153. The one or more memories 155 and the computer program code 153 are configured to, with the one or more processors 150, cause a corresponding one of the eNBs 220 to perform one or more of the operations as described herein. The one or more network interfaces 161 communicate over a network such as the networks 170 and 131. Two or more eNBs 220 communicate using, e.g., network 170. The network 170 may be wired or wireless or both and may implement, e.g., an X2 interface.

The wireless network 100 may include a network control element (NCE) 205 that may include MME/SGW functionality, and which provides connectivity with a further network, such as a telephone network and/or a data communications network (e.g., the Internet). The eNB 220 is coupled via a network 131 to the NCE 250. The network 131 may be implemented as, e.g., an S1 interface. The NCE 250 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 250 to perform one or more operations.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 150, and 175 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments of the user equipment 110 can include, but are not limited to, cellular telephones such as smart phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

The exemplary embodiments herein concern CSI. It is noted that CSI is a generic term covering, e.g., CQI, PMI, PTI, and/or RI. See, e.g., section 7.2 of 3GPP TS 36.213 V10.3.0 (September 2011): "The time and frequency resources that can be used by the UE to report CSI which consists of channel quality indicator (CQI), precoding matrix indicator (PMI), precoding type indicator (PTI), and/or rank indication (RI) are controlled by the eNB." Exhibit C includes sections 7.2 through and including section 8 of 36.213, and includes information about CQI and PMI and their feedback in current LTE systems (see section 7.2). For instance, periodic and aperiodic CQI are described. Exhibit C is attached hereto and forms part of the present disclosure. Further, it is noted that periodic reporting is configured semi-statically with RRC signaling and reports are transmitted in a set of predefined subframes with a given periodicity (e.g., every 5 milliseconds (ms), 10 ms, etc.). Aperiodic reports are triggered individually by the eNodeB: when the eNodeB sends an uplink grant with the aperiodic trigger, the UE shall send one aperiodic CSI report. Additionally, aperiodic reports are always transmitted on PUSCH. Periodic reports can be transmitted on PUCCH or on PUSCH, depending on UL grants and configuration.

The exemplary embodiments include a coverage enhancement scheme for the CSI to be transmitted on the uplink side. An exemplary embodiment includes each of the following parts:

1) Slowing down the CSI measurement cycle at the UE side; and

2) Reporting the same CSI report multiple times from the UE to an eNB.

Number (1) can be considered downsampling, as the UE measures the CSI once and keeps exactly the same measurement for a predetermined time window. By contrast, the current cycle for CSI measurement and reporting is such that the UE performs separate CSI measurements for each report.

The CSI measurement cycle can be defined by means of a time window (longer than one subframe), during which the triggered CSI shall correspond to the same DL subframe (known as the CSI reference resource using the terminology in the 3GPP specifications) and the same CSI measurement, and hence the contents of the CSI reports shall remain exactly the same. This allows for combining (e.g., averaging) of the reports by the eNodeB.

Figure 3:
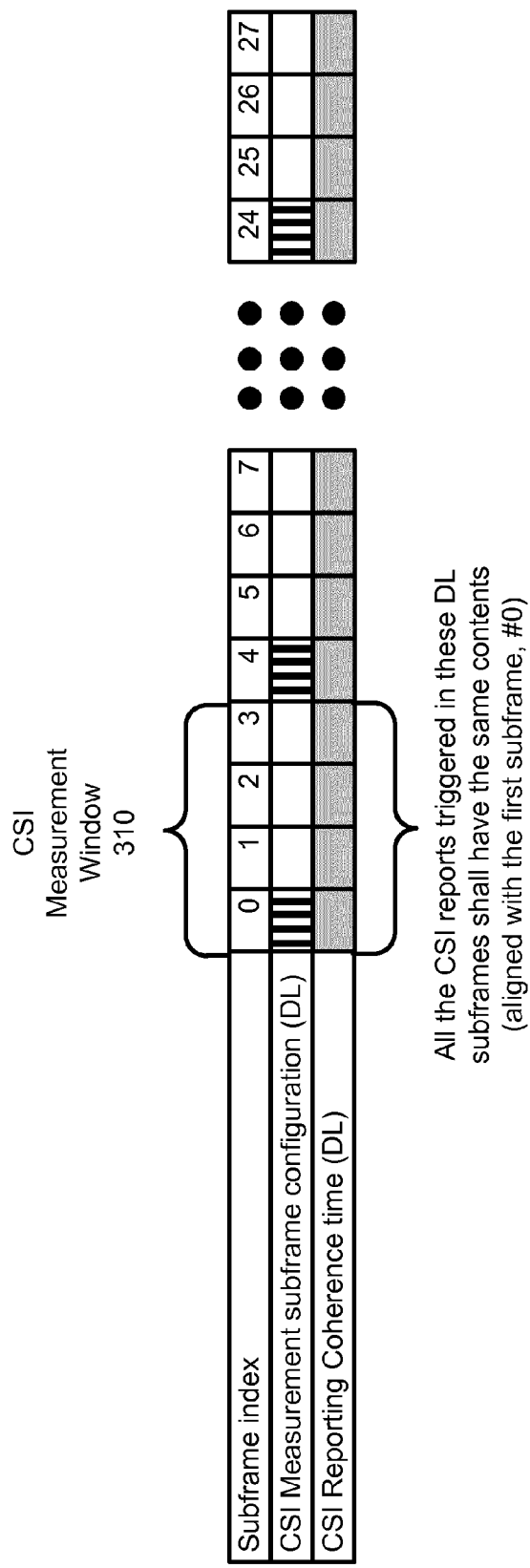
FIG. 3 shows an example of a CSI measurement window of four subframes.

FIG. 3 shows an example of CSI measurement window 310 of four subframes. In FIG. 3, the thick back bars show the subframes (0, 4, 8, 12, 16, 20, and 24, of which 0, 4, and 24 are shown in this figure) with CSI measurements, i.e., CSI reference resources. In this example, all the CSI reports (not shown in FIG. 3) triggered in DL subframes zero to three shall have the same contents. It is noted that the aperiodic trigger is sent to the UE in a DL subframe on the physical DL control channel (PDCCH), and more specifically in the UL grant in the PDCCH. So, all the triggers are in the DL subframes. Alignment means that CSI measurements corresponding to DL subframes "1", "2", and "3" are taken from the measurement performed during DL subframe "0". The new CSI measurement is made again in DL subframe "4". That is, if the UE 110 happens to transmit a CQI report corresponding to DL subframes "0" and "2" the content of the CQI report will be exactly the same.

In the following, various use cases are provided as separate exemplary embodiments. The first exemplary use case concerns bundling of periodic CSI on PUCCH. In this embodiment, CSI report relates to periodic CSI on PUCCH (e.g., using PUCCH format 2) and the resources to transmit the same CSI report using multiple uplink subframes are arranged by the eNB 220 by configuring multiple PUCCH (e.g., Format 2) channels on consecutive subframes to the UE 110. This could be performed by, e.g., introducing a parameter "CSI burst length" into the periodic CSI reporting configuration (RRC signaling), indicating how many times the CSI report should be repeated or into how many uplink subframes the CSI report should be coded. Exhibit D contains pages from 3GPP TS 36.331 V10.2.0 (June 2011), describing Radio Resource Control and its protocol specification. Exhibit D is attached hereto, forms part of the present disclosure, and includes a section on "CQI-ReportConfig" and its information elements. The parameter "CSI burst length" may be introduced, for instance, into the information elements for "CQI-ReportConfig".

A second use case concerns bundling of aperiodic CSI on PUSCH. In this embodiment, a CSI report relates to aperiodic CSI, and the resources to transmit the same CSI report using multiple uplink subframes are arranged by the eNB 220 allocating multiple PUSCH on consecutive subframes to the UE 110. An exemplary embodiment is to combine CSI bundling with subframe bundling supported by LTE Rel-8 (in other words, multiple PUSCHs are allocated by means of subframe bundling). A relevant option is to borrow the existing procedure (described above) defined for the control data transmission via PUSCH without UL-SCH data (i.e., the PUSCH contains all control data and no UL-SCH data) and to adapt the existing procedure to subframe bundling. The principle can be applied also in the case PUSCH contains UL-SCH data. In this case, the control signaling area (e.g., and formatting) are used on the PUSCH.

An alternative, implementation specific, way of achieving the coverage enhancements is to trigger aperiodic CSI reporting in multiple consecutive subframes when the downsampled CSI measurements have been configured and to combine (e.g., average) the reports, e.g., coherently at the eNodeB. The drawback of this option is that a separate UL grant is required for each uplink subframe used for CSI reporting.

Regarding the PUSCH and the UL-SCH, as is known, the PUSCH is used to transmit the UL-SCH and L1 and L2 control information. The UL-SCH is the transport channel used for transmitting uplink data. L1 and L2 control signaling can carry the following type of information: HARQ acknowledgements for received DL-SCH (downlink shared channel) blocks, CSI reports, and scheduling requests.

A third use case concerns bundling of periodic CSI on PUSCH. In this embodiment, PUSCH utilizes the subframe bundling mode. In order to guarantee the quality of bundled CSI, the following exemplary limitations for the CSI bundling are recommended:

1) In the case when periodic CSI collides with the first subframe of bundled PUSCH, CSI is bundled together with UL-SCH data (i.e., CSI is multiplexed with the data on the UL-SCH and CSI is transmitted in the whole set of bundled PUSCH subframes). That is, if the periodic CSI report is supposed to be sent on a particular set of subframes and one of those set of subframes is the first subframe of a bundled PUSCH, then there is a collision.

2) Otherwise (i.e., a periodic CSI collides with other than a first subframe of a bundled PUSCH), periodic CSI is dropped (i.e., just omitted) and only UL-SCH is transmitted.

As alternative solution, when the UE 110 receives scheduling for bundled PUSCH, the UE 110 checks if periodic CSI reporting will collide with the PUSCH transmission. If so, the UE will advance CSI transmission and corresponding measurements and bundle CSI together with UL-SCH data already from the first subframe. This again refers to the case when the CSI collides with a subframe of the bundle that is not the first one. So, if the UE is supposed to transmit the CSI in the subframe X, which happens to be, e.g., the second subframe of the bundle, the UE will instead advance the measurements and start reporting the CSI already in the first subframe of the bundle, i.e., in subframe X-1. The point here is not to avoid collision, but to ensure that the CSI gets bundled with the data to guarantee sufficient coverage.

Additional exemplary implementation details are as follows. Regarding CSI bundling configuration, for each UE, configured to CSI bundling mode, the following signaling may be used:

1) The signaling can be semi-static (e.g., RRC or MAC), and preferably UE specific. Semi-static means that the signaling is not fully dynamic (i.e., a subframe-level adjustment). RRC signaling may be the most probable signaling choice. The periodicity is typically on the order of hundreds of milliseconds. MAC level signaling is faster (e.g., up to 10 milliseconds). However, it is hard to put exact figures on this signaling, and the figures here are merely exemplary.

2) The signaling contains, e.g., configuration of the CSI measurement window 310.

The CSI measurement window 310 should be predefined and configured by proper signaling (e.g., RRC signaling). The CSI measurement window 310 can be defined in a UE-specific pattern which defines for how many downlink subframes the UE 110 needs to measure the CSI and how many uplink subframes to use for CSI reporting, if triggered. The following support in the signaling side is recommended to support this:

1) CSI measurement configuration, i.e., defining a set of subframes where the UE is expected to measure the CSI as in the CSI measurement window 310. Note that, in one example, CSI measurement occurs in selected one or more of the set of subframes, but does not necessarily occur in other (i.e., unselected) subframes of the set of subframes. In another exemplary embodiment, the CSI measurements occur in multiple selected subframes in the set (e.g., up to all of the subframes in the set), e.g., in order to improve averaging of the CSI. The CSI report therefore includes a single measurement result averaged using multiple CSI measurements.

2) CSI reporting coherence time: the time window during which the triggered CSI reports shall correspond to the same DL subframe.

3) One pattern or a single parameter (e.g., k) might be enough: simply define that the contents of CSI reports triggered in any DL subframe between subframe n and subframe n+k should comply with a given subframe (subframe n).

Concerning encoding the bundled CSI, there are few principles which can be applied to form the bundled CSI message:

1) Repetition coding (i.e., the same CSI report, e.g., packet, is just repeated multiple times corresponding to multiple transmission instants).

2) Incremental redundancy: CSI to be reported multiple times represents different redundancy versions of the same packet.

3) CSI to be reported multiple times from UE 110 to eNB 220 is split in a predetermined way among multiple transmission instances (e.g., in the case the number of transmission instants corresponds to N and the number of transmitted bits in the CSI report corresponds to M, the size of each subpacket is given by ceil(M/N), where "ceil( )" is a ceiling function).

4) Concatenated coding. The inner code in concatenated coding can be restricted to each subframe while the outer code is spread over all bundled subframes.

Regarding bundling of aperiodic CSI transmission on PUSCH, as stated above, a suitable exemplary embodiment is to borrow the existing procedure defined for the control data transmission via PUSCH without UL-SCH data. In that case, subframe bundling can be dynamically selected for the aperiodic CSI. When the aperiodic CSI-only transmission is scheduled, NDI (new data indicator) bit (or some other suitable bit or code point such as some MCS value) in the scheduling grant can be used to indicate whether the aperiodic CSI report is subframe bundled or not. Other required configuration for bundling is predetermined via RRC. The configuration may include two different CSI configurations, one corresponding to bundled and the other to non-bundled aperiodic CSI.

Figure 4:
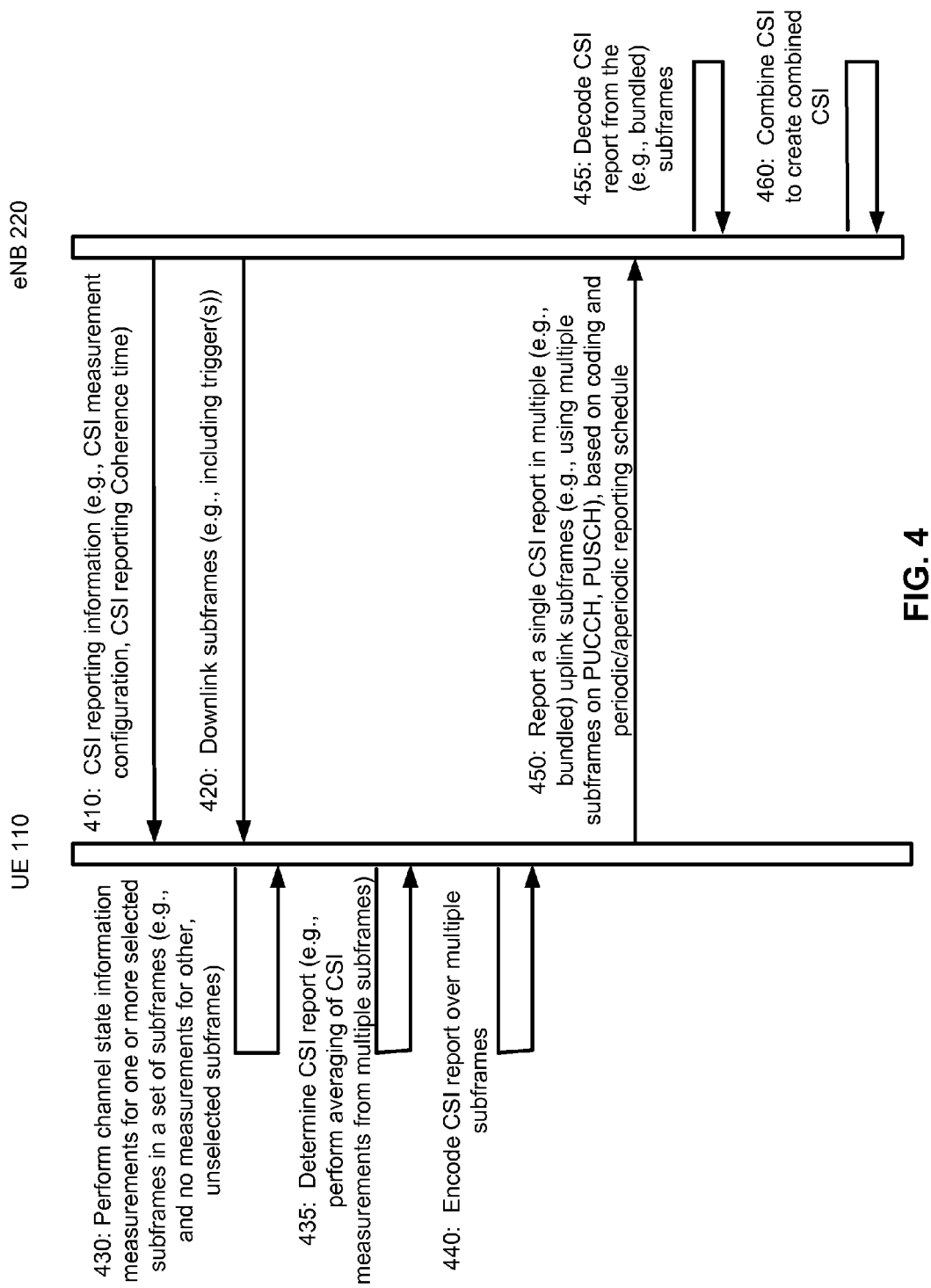
FIG. 4 is an exemplary process diagram illustrating actions taken for a user equipment and a base station (e.g., eNB) for techniques for providing enhanced CSI coverage in the uplink direction.

Turning now to FIG. 4, an exemplary process diagram is shown illustrating actions taken for a user equipment (e.g., UE 110) and a base station (e.g., eNB 220) for techniques for providing enhanced CSI coverage in the uplink direction. In step 410, the eNB 220 sends CSI reporting information to the UE. The CSI reporting information in this example includes the CSI measurement configuration (defining the CSI measurement window 310) and the CSI reporting coherence time, as described above. As also noted above, these may be replaced by one pattern or a single parameter (e.g., k). The CSI reporting configuration allows the UE to determine a set of subframes where the UE is expected to measure the CSI (and not measure the CSI in others of the subframes), and a time window during which the triggered CSI reports shall correspond to the same DL subframe.

In step 420, the eNB 220 transmits and the UE 110 receives the downlink subframes. Some of the downlink subframes may include a trigger for aperiodic CSI reporting. When considering aperiodic reporting, if the UE does not receive the trigger in 420, the remaining steps (e.g., 435 and subsequent steps) are not carried out. In Step 430, the UE 110 performs channel state information measurements for selected downlink subframes (and no measurements for other, unselected downlink subframes) in the set of subframes, as per the CSI measurement window 310. If downsampling is desired (and configured as per 410), the UE selects and performs CSI measurements in less than all of the set of subframes, such as shown in FIG. 3 where one of four subframes is selected and a CSI measurement is performed in that selected subframe. As another example, the UE 110 may perform CSI measurements for all of the subframes in the set (i.e., all subframes are selected) or multiple but not all of the subframes in the set.

In step 435, the UE 110 determines, through known techniques, the CSI report based on the CSI measurements. As is noted, for a CSI measurement configuration where multiple subframes from a set are measured for CSI, CSI averaging may be performed. In step 440, the UE 110 encodes the single CSI report over multiple (e.g., bundled) uplink subframes. Techniques for coding were described above. In step 450, the UE reports the single CSI report in multiple (e.g., bundled) uplink subframes (e.g., using multiple subframes on PUCCH, PUSCH, as described in detail above), based on coding and periodic/aperiodic reporting schedule (as described in detail above). In step 455, the eNB 220 decodes the CSI report from the (e.g., bundled) subframes. In step 460, the eNB 220 may also combine, in certain embodiments, the CSI to create a combined CSI. For instance, if repetition coding of the CSI report is performed, the multiple instances of the CSI report may be combined. Combining CSI reports should provide improved coverage for CSI reporting.

Exemplary advantages include the following non-limiting advantages:

1) Exemplary embodiments allow for the eNB to combine consecutive reports to achieve improved coverage for CSI reporting.

2) Exemplary embodiments are compatible with UL-SCH bundling (e.g., an exemplary proposed design completes the CSI part missing in the current UL-SCH bundling solution).

3) Cell edge UEs can utilize larger CSI reports (e.g., improved CSI can be provided by the cell edge UEs, allowing for more accurate link adaptation and hence enhanced coverage).

4) There is a positive impact on CSI measurement complexity at the UE (due to reduced CSI measurement cycle).

5) The UE/eNB complexity increase is minor (e.g., this can be seen as minor software update).

As described above, at least the following examples have been disclosed.

1. A method, comprising: performing, at a user equipment, one or more channel state information measurements on selected ones of a plurality of downlink subframes; and reporting from the user equipment to a base station a single channel state information report in multiple uplink subframes, the single channel state information report corresponding to the one or more channel state information measurements of the selected ones of plurality of downlink subframes.

2. The method of item 1, wherein reporting is performed on a schedule for periodic channel state information reporting and reporting further comprises reporting the single channel state information report on multiple physical uplink control channels on consecutive uplink subframes.

3. The method of item 2, further comprising, prior to reporting, receiving using radio resource control signaling a parameter indicating how many times the channel state information report should be repeated, wherein a number of consecutive uplink subframes is determined by the user equipment using the parameter.

4. The method of item 1, wherein reporting is performed on a schedule for aperiodic channel state information reporting and reporting further comprises reporting the single channel state information report on each of a set of multiple, bundled physical uplink channel subframes.

5. The method of item 4, wherein the set of multiple, bundled physical uplink channel subframes does not have uplink shared channel data and the reporting uses a control data area on each of the set of multiple, bundled physical uplink channel subframes.

6. The method of item 4, wherein the set of multiple, bundled physical uplink channel subframes has uplink shared channel data and the reporting uses a control data area on each of the set of multiple, bundled physical uplink channel subframes.

7. The method of item 1, wherein reporting is performed on a schedule for periodic channel state information reporting and reporting further comprises in response to a scheduled channel state information report colliding with a first uplink subframe of a set of uplink subframes to be bundled on a physical uplink shared channel, multiplexing the channel state information report and data together on an uplink shared channel on the set of uplink subframes bundled on the physical uplink shared channel.

8. The method of item 1, wherein reporting is performed on a schedule for periodic channel state information reporting and reporting further comprises in response to a scheduled channel state information report colliding with a particular uplink subframe other than a first uplink subframe of a set of subframes to be bundled on a physical uplink shared channel, omitting the channel state information report for the set of uplink subframes.

9. The method of item 1, wherein reporting is performed on a schedule for periodic channel state information reporting and reporting further comprises in response to a scheduled channel state information report colliding with a particular uplink subframe other than a first uplink subframe of a set of uplink subframes to be bundled on a physical uplink shared channel, advancing reporting of the channel state information report from the particular uplink subframe to the first uplink subframe in the set of uplink subframes to be bundled on the physical uplink shared channel, and multiplexing the channel state information report and data together on an uplink shared channel on the set of uplink subframes bundled on the physical uplink shared channel.

10. The method of item 1, further comprising receiving at the user equipment from the base station a first indication allowing the user equipment to determine the number of selected downlink subframes and a second indication allowing the user equipment to determine how many times the user equipment should report the single channel state information from the user equipment to the base station.

11. The method of item 1, wherein reporting further comprises reporting a same single channel state information report in each of the multiple subframes.

12. The method of item 1, wherein the single channel state information report comprises a packet and reporting further comprises using a different version of the packet for each of the multiple subframes.

13. The method of item 1, wherein reporting further comprises splitting the single channel state information report in a predetermined way among each of the multiple subframes.

14. The method of item 1, wherein reporting further comprises subjecting the single channel state information report to concatenated coding, where an inner code is restricted to each of the plurality of subframes while an outer code is spread over all subframes in the plurality of subframes.

15. The method of any one of the preceding items, where a number of selected downlink subframes is less than all of the plurality of downlink subframes.

16. The method of item 15, wherein the number of selected downlink subframes is one.

17. The method of any one of the preceding items, wherein the plurality of downlink subframes is a set of downlink subframes, and wherein performing and reporting are repeated by the user equipment for multiple sets of downlink subframes.

18. An apparatus comprising: one or more processors; and one or more memories including computer program code, the one or more memories and the computer program code configured to, with the one or more processors, cause the apparatus to perform the method of any one of the preceding items.

19. A computer program product comprising a computer-readable medium bearing computer program code embodied therein for use with a computer, the computer program code comprising code for performing the method of any one of items 1 to 17.

20. A method, comprising: signaling from a base station to a user equipment information the user equipment uses to perform one or more channel state information measurements on selected ones of a plurality of downlink subframes; and receiving at the base station from the user equipment a single channel state information report in multiple uplink subframes, the single channel state information report corresponding to the one or more channel state information measurements on the selected ones of plurality of downlink subframes.

21. The method of item 20, wherein receiving is performed on a schedule for periodic channel state information reporting and receiving further comprises receiving the single channel state information report on multiple physical uplink control channels on consecutive uplink subframes.

22. The method of item 21, wherein signaling further comprises sending, from the base station to the user equipment and using radio resource control signaling, a parameter indicating how many times the channel state information report should be repeated, wherein a number of consecutive uplink subframes may be determined by the user equipment using the parameter.

23. The method of item 20, wherein receiving is performed on a schedule for aperiodic channel state information reporting and receiving further comprises receiving the single channel state information report on each of a set of multiple, bundled physical uplink channel subframes.

24. The method of item 23, wherein the set of multiple, bundled physical uplink channel subframes does not have uplink shared channel data and the receiving uses a control data area on each of the set of multiple, bundled physical uplink channel subframes.

25. The method of item 23, wherein the set of multiple, bundled physical uplink channel subframes has uplink shared channel data and the receiving uses a control data area on each of the set of multiple, bundled physical uplink channel subframes.

26. The method of item 20, wherein receiving is performed on a schedule for periodic channel state information reporting and receiving further comprises in response to a scheduled channel state information report colliding with a first uplink subframe of a set of uplink subframes bundled on a physical uplink shared channel, receiving the channel state information report multiplexed with data together on an uplink shared channel on the first uplink subframe of the physical uplink shared channel.

27. The method of item 20, wherein receiving is performed on a schedule for periodic channel state information reporting and receiving further comprises, in response to a scheduled channel state information report colliding with a particular uplink subframe other than the first uplink subframe of a set of subframes bundled on a physical uplink shared channel, determining the channel state information report has been omitted for the set of uplink subframes on the physical uplink shared channel.

28. The method of item 20, wherein receiving is performed on a schedule for periodic channel state information reporting and receiving further comprises, in response to a scheduled channel state information report colliding with a particular uplink subframe other than the first uplink subframe of a set of uplink subframes bundled on a physical uplink shared channel, receiving the channel state information report in the first uplink subframe instead of in the particular uplink subframe in the set of uplink subframes on the physical uplink shared channel.

29. The method of item 20, further comprising sending from the base station to the user equipment a first indication allowing the user equipment to determine the number of selected downlink subframes and a second indication allowing the user equipment to determine how many times the user equipment should report the single channel state information from the user equipment to the base station.

30. The method of item 20, wherein receiving further comprises receiving a same single channel state information report in each of the multiple uplink subframes.

31. The method of item 20, wherein the single channel state information report comprises a packet and receiving further comprises receiving a different version of the packet for each of the multiple uplink subframes.

32. The method of item 20, wherein receiving further comprises receiving the single channel state information report that is split in a predetermined way among each of the multiple uplink subframes.

33. The method of item 20, wherein the single channel state information report was subjected to concatenated coding prior to transmission, where an inner code is restricted to each of the plurality of uplink subframes while an outer code is spread over all uplink subframes in the plurality of uplink subframes, and the method further comprises decoding the single channel state information from the plurality of uplink subframes based on the concatenated coding.

34. The method of any one of items 20 to 33, where a number of selected downlink subframes is less than all of the plurality of downlink subframes.

35. The method of item 34, wherein the number of selected downlink subframes is one.

36. The method of any one of items 20 to 35, wherein the plurality of downlink subframes is a set of downlink subframes, and wherein signaling and receiving are repeated by the user equipment for multiple sets of downlink subframes.

37. The method of any one of items 20 to 36, further comprising the base station combining channel state information in the channel state information reports to determine a combined channel state information.

38. An apparatus comprising: one or more processors; and one or more memories including computer program code, the one or more memories and the computer program code configured to, with the one or more processors, cause the apparatus to perform the method of any one of items 20 to 37.

39. A computer program product comprising a computer-readable medium bearing computer program code embodied therein for use with a computer, the computer program code comprising code for performing the method of any one of items 20 to 37.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 2. A computer-readable medium may comprise a computer-readable storage medium (e.g., memories 125, 155, 171 or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. A method, comprising:
   performing, at a user equipment, one or more channel state information measurements on selected ones of a plurality of downlink subframes; and
   reporting from the user equipment to a base station a single channel state information report in multiple uplink subframes, the single channel state information report corresponding to the one or more channel state information measurements of the selected ones of plurality of downlink subframes,
   wherein the method further comprises receiving at the user equipment from the base station a first indication allowing the user equipment to determine the number of selected downlink subframes and a second indication allowing the user equipment to determine how many times the user equipment should report the single channel state information from the user equipment to the base station.

2. The method of claim 1, wherein reporting is performed on a schedule for periodic channel state information reporting and reporting further comprises reporting the single channel state information report on multiple physical uplink control channels on consecutive uplink subframes.

3. The method of claim 2, further comprising, prior to reporting, receiving using radio resource control signaling a parameter indicating how many times the channel state information report should be repeated, wherein a number of consecutive uplink subframes is determined by the user equipment using the parameter.

4. The method of claim 1, wherein reporting is performed on a schedule for aperiodic channel state information reporting and reporting further comprises reporting the single channel state information report on each of a set of multiple, bundled physical uplink channel subframes.

5. The method of claim 4, wherein the set of multiple, bundled physical uplink channel subframes does not have uplink shared channel data and the reporting uses a control data area on each of the set of multiple, bundled physical uplink channel subframes.

6. The method of claim 4, wherein the set of multiple, bundled physical uplink channel subframes has uplink shared channel data and the reporting uses a control data area on each of the set of multiple, bundled physical uplink channel subframes.

7. The method of claim 1, wherein reporting is performed on a schedule for periodic channel state information reporting and reporting further comprises in response to a scheduled channel state information report colliding with a first uplink subframe of a set of uplink subframes to be bundled on a physical uplink shared channel, multiplexing the channel state information report and data together on an uplink shared channel on the set of uplink subframes bundled on the physical uplink shared channel.

8. The method of claim 1, wherein reporting is performed on a schedule for periodic channel state information reporting and reporting further comprises in response to a scheduled channel state information report colliding with a particular uplink subframe other than a first uplink subframe of a set of subframes to be bundled on a physical uplink shared channel, omitting the channel state information report for the set of uplink subframes.

9. The method of claim 1, wherein reporting is performed on a schedule for periodic channel state information reporting and reporting further comprises in response to a scheduled channel state information report colliding with a particular uplink subframe other than a first uplink subframe of a set of uplink subframes to be bundled on a physical uplink shared channel, advancing reporting of the channel state information report from the particular uplink subframe to the first uplink subframe in the set of uplink subframes to be bundled on the physical uplink shared channel, and multiplexing the channel state information report and data together on an uplink shared channel on the set of uplink subframes bundled on the physical uplink shared channel.

10. The method of claim 1, wherein reporting further comprises reporting a same single channel state information report in each of the multiple subframes.

11. The method of claim 1, wherein the single channel state information report comprises a packet and reporting further comprises using a different version of the packet for each of the multiple subframes.

12. The method of claim 1, wherein reporting further comprises splitting the single channel state information report in a predetermined way among each of the multiple subframes.

13. The method of claim 1, wherein reporting further comprises subjecting the single channel state information report to concatenated coding, where an inner code is restricted to each of the plurality of subframes while an outer code is spread over all subframes in the plurality of subframes.

14. The method of claim 1, wherein a number of selected downlink subframes is less than all of the plurality of downlink subframes and the number of selected downlink subframes is one.

15. The method of claim 1, wherein the plurality of downlink subframes is a set of downlink subframes, and wherein performing and reporting are repeated by the user equipment for multiple sets of downlink subframes.

16. An apparatus comprising:
one or more processors; and
one or more memories including computer program code, the one or more memories and the computer program code configured to, with the one or more processors, cause the apparatus to perform at least the following:
performing, at a user equipment, one or more channel state information measurements on selected ones of a plurality of downlink subframes;
reporting from the user equipment to a base station a single channel state information report in multiple uplink subframes, the single channel state information report corresponding to the one or more channel state information measurements of the selected ones of plurality of downlink subframes; and
receiving at the user equipment from the base station a first indication allowing the user equipment to determine the number of selected downlink subframes and a second indication allowing the user equipment to determine how many times the user equipment should report the single channel state information from the user equipment to the base station.

17. A method, comprising:
signaling from a base station to a user equipment information the user equipment uses to perform one or more channel state information measurements on selected ones of a plurality of downlink subframes; and
receiving at the base station from the user equipment a single channel state information report in multiple uplink subframes, the single channel state information report corresponding to the one or more channel state information measurements on the selected ones of plurality of downlink subframes;
wherein the method further comprises sending from the base station to the user equipment a first indication allowing the user equipment to determine the number of selected downlink subframes and a second indication allowing the user equipment to determine how many times the user equipment should report the single channel state information from the user equipment to the base station.

18. The method of claim 17, wherein receiving is performed on a schedule for periodic channel state information reporting and receiving further comprises receiving the single channel state information report on multiple physical uplink control channels on consecutive uplink subframes.

19. The method of claim 18, wherein signaling further comprises sending, from the base station to the user equipment and using radio resource control signaling, a parameter indicating how many times the channel state information report should be repeated, wherein a number of consecutive uplink subframes may be determined by the user equipment using the parameter.

20. The method of claim 17, wherein receiving is performed on a schedule for aperiodic channel state information reporting and receiving further comprises receiving the single channel state information report on each of a set of multiple, bundled physical uplink channel subframes.

21. The method of claim 20, wherein the set of multiple, bundled physical uplink channel subframes does not have uplink shared channel data and the receiving uses a control data area on each of the set of multiple, bundled physical uplink channel subframes.

22. The method of claim 20, wherein the set of multiple, bundled physical uplink channel subframes has uplink shared channel data and the receiving uses a control data area on each of the set of multiple, bundled physical uplink channel subframes.

23. The method of claim 17, wherein receiving is performed on a schedule for periodic channel state information reporting and receiving further comprises in response to a scheduled channel state information report colliding with a first uplink subframe of a set of uplink subframes bundled on a physical uplink shared channel, receiving the channel state information report multiplexed with data together on an uplink shared channel on the first uplink subframe of the physical uplink shared channel.

24. The method of claim 17, wherein receiving is performed on a schedule for periodic channel state information reporting and receiving further comprises, in response to a scheduled channel state information report colliding with a particular uplink subframe other than the first uplink subframe of a set of subframes bundled on a physical uplink shared channel, determining the channel state information report has been omitted for the set of uplink subframes on the physical uplink shared channel.

25. The method of claim 17, wherein receiving is performed on a schedule for periodic channel state information reporting and receiving further comprises in response to a scheduled channel state information report colliding with a particular uplink subframe other than the first uplink subframe of a set of uplink subframes bundled on a physical uplink shared channel, receiving the channel state information report in the first uplink subframe instead of in the particular uplink subframe in the set of uplink subframes on the physical uplink shared channel.

26. The method of claim 17, wherein receiving further comprises receiving a same single channel state information report in each of the multiple uplink subframes.

27. The method of claim 17, wherein the single channel state information report comprises a packet and receiving further comprises receiving a different version of the packet for each of the multiple uplink subframes.

28. The method of claim 17, wherein receiving further comprises receiving the single channel state information report that is split in a predetermined way among each of the multiple uplink subframes.

29. The method of claim 17, wherein the single channel state information report was subjected to concatenated coding prior to transmission, where an inner code is restricted to each of the plurality of uplink subframes while an outer code is spread over all uplink subframes in the plurality of uplink subframes, and the method further comprises decoding the single channel state information from the plurality of uplink subframes based on the concatenated coding.

30. The method of claim 17, where a number of selected downlink subframes is less than all of the plurality of downlink subframes.

31. The method of claim 30, wherein the number of selected downlink subframes is one.

32. The method of claim 17, wherein the plurality of downlink subframes is a set of downlink subframes, and wherein signaling and receiving are repeated, by the user equipment for multiple sets of downlink subframes.

33. The method of claim 17, further comprising combining, at the base station, the channel state information reports received in the multiple uplink subframes to determine a combined channel state information.

34. An apparatus comprising:
one or more processors; and one or more memories including computer program code, the one or more memories and the computer program code configured to, with the one or more processors, cause the apparatus to perform at least the following:
signaling from a base station to a user equipment information the user equipment uses to perform one or more channel state information measurements on selected ones of a plurality of downlink subframes;
receiving at the base station from the user equipment a single channel state information report in multiple uplink subframes, the single channel state information report corresponding to the one or more channel state information measurements on the selected ones of plurality of downlink subframes; and
sending from the base station to the user equipment a first indication allowing the user equipment to determine the number of selected downlink subframes and a second indication allowing the user equipment to determine how many times the user equipment should report the single channel state information from the user equipment to the base station.

35. A computer program product comprising a non-transitory computer-readable medium having program code embodied thereon, the program code executable by a device to cause the device to perform the method according to claim 1.

36. A method, comprising:
performing, at a user equipment, one or more channel state information measurements on selected ones of a plurality of downlink subframes;
receiving using radio resource control signaling a parameter indicating how many times a single channel state information report should be repeated, wherein a number of consecutive uplink subframes is determined by the user equipment using the parameter; and
reporting from the user equipment to a base station the single channel state information report on multiple physical uplink control channels on the consecutive uplink subframes, the single channel state information report corresponding to the one or more channel state information measurements of the selected ones of plurality of downlink subframes,
wherein reporting is performed on a schedule for periodic channel state information reporting.

37. A method, comprising:
signaling from a base station to a user equipment information the user equipment uses to perform one or more channel state information measurements on selected ones of a plurality of downlink subframes;

receiving at the base station from the user equipment a single channel state information report in multiple uplink subframes, the single channel state information report corresponding to the one or more channel state information measurements on the selected ones of plurality of downlink subframes;

wherein the receiving is performed on a schedule for periodic channel state information reporting and the receiving further comprises receiving the single channel state information report on multiple physical uplink control channels on consecutive uplink subframes, and wherein the signaling further comprises sending, from the base station to the user equipment and using radio resource control signaling, a parameter indicating how many times the channel state information report should be repeated, wherein a number of consecutive uplink subframes may be determined by the user equipment using the parameter.

* * * * *